United States Patent
Gray et al.

(10) Patent No.: US 6,795,969 B2
(45) Date of Patent: Sep. 21, 2004

(54) TRANSFER OF BASIC KNOWLEDGE TO AGENTS

(75) Inventors: Thomas A. Gray, Carp (CA); Deborah L. Pinard, Carp (CA)

(73) Assignee: Mitel Corporation, Kanata (CA)

( * ) Notice: Subject to any disclaimer, the term of this patent is extended or adjusted under 35 U.S.C. 154(b) by 464 days.

(21) Appl. No.: 09/973,756

(22) Filed: Oct. 11, 2001

(65) Prior Publication Data

US 2002/0023119 A1 Feb. 21, 2002

Related U.S. Application Data

(63) Continuation of application No. 08/780,409, filed on Jan. 9, 1997, now abandoned.

(51) Int. Cl.⁷ .................................................. G06F 9/44
(52) U.S. Cl. ........................................ 719/317; 718/104
(58) Field of Search ................................ 719/317, 313, 719/310, 331; 709/202, 223, 226; 379/201.03; 718/104, 102; 717/162–164

(56) References Cited

U.S. PATENT DOCUMENTS

| | | | | |
|---|---|---|---|---|
| 4,330,822 A | * | 5/1982 | Dodson | 364/200 |
| 5,129,083 A | | 7/1992 | Cutler et al. | |
| 5,212,790 A | * | 5/1993 | Ohler et al. | 395/650 |
| 5,414,854 A | * | 5/1995 | Heninger et al. | 395/700 |
| 5,448,735 A | * | 9/1995 | Anderson et al. | 395/650 |
| 5,463,682 A | * | 10/1995 | Fisher et al. | 379/201.04 |
| 5,577,250 A | * | 11/1996 | Anderson et al. | 395/670 |
| 5,603,034 A | * | 2/1997 | Swanson | 395/701 |
| 5,625,845 A | * | 4/1997 | Allran et al. | 395/856 |
| 5,638,494 A | * | 6/1997 | Pinard et al. | 395/60 |
| 5,655,081 A | * | 8/1997 | Bonnell et al. | 395/200.32 |
| 5,658,351 A | * | 8/1997 | Teng | 364/200 |
| 5,758,160 A | * | 5/1998 | McInerney et al. | 395/701 |
| 5,761,288 A | * | 6/1998 | Pinard et al. | 379/201.03 |
| 5,768,506 A | * | 6/1998 | Randell | 395/200.32 |
| 5,802,396 A | * | 9/1998 | Gray | 395/840 |

FOREIGN PATENT DOCUMENTS

WO  94/23360  10/1994

OTHER PUBLICATIONS

F. Rabii, et al, "The Process Management Architecture of OSF/1 AD Version 2", OSF Research Institute, Sep. 1993. pp (17).*
M. Weiss, et al, "An Agent–based Distributed Multimedia Service Environment", IEEE, pp. 490–491, 1995.*
G. Pujolle, et al "ATM Flow Control Schemes Through a Multi–Agent System", IEEE, pp. 455–459, Sep. 1993.*

* cited by examiner

Primary Examiner—Sue Lao
(74) Attorney, Agent, or Firm—Shapiro Cohen; Robert A. Wilkes; Dennis S. K. Leung

(57) ABSTRACT

A method of establishing a process agent comprising storing a library of first software programs representing system resources, storing a second software program representing a corresponding service agent which includes pointers to associated ones of the first software programs which are represented by the service agent, storing a software program for invoking a general process, including the steps of: requesting a usage right for functional services represented by the service agent required by the general process, sending pointers to system resources required for the general process from the service agent to the software program for operating the general process, and storing the pointers sent from the service agent in association with the software program for operating the general process, and executing the software program for operating the general process using the system resources identified by the stored pointers.

5 Claims, 5 Drawing Sheets

TRANSFER OF BASIC KNOWLEDGE TO AGENTS

This application is a continuation application of U.S. application Ser. No. 08/780,409 filed Jan. 9, 1997 now abandoned.

FIELD OF THE INVENTION

This invention relates to methods of controlling communication or other systems and in particular to a method of establishing a process using software agent control.

SUMMARY OF THE INVENTION

The present invention is an improvement and relates to earlier inventions described in U.S. patent application Ser. No. 08/257,917 filed Jun. 10, 1994 and patented Jun. 10, 1997 under U.S. Pat. No. 5,683,494, invented by Deborah Pinard et al and Ser. No. 08/367,821 filed Jan. 3, 1995 invented by Thomas Gray, now U.S. Pat. No. 5,802,396 issued Sep. 1, 1998, which are incorporated herein by reference.

In an embodiment of the present invention, software objects for operating resources are stored in a random access memory (RAM), in a resource area of a functional process for carrying out the process, which resources are identified during a blackboard bidding process by service agents which have pointers to resource agents controlling the resources.

In accordance with another embodiment of the invention, a method of abstractly and recursively defining a functional service utilizing a process agent is comprised of (a) storing a library of first software programs for operation of system resources, (b) storing a second software program for operation of a service agent which provides said functional service, and which includes pointers to associated ones of the first software programs which are controlled by the service agent, (c) storing a software program for assembling a general process to provide the functional service, including the steps of: (i) requesting the usage right for system resources controlled by the service agent required by the general process, (ii) sending a set of pointers to system resources required for the general process from the service agent to the software program for invoking the general process, and (iii) storing the set of pointers sent from the service agent in association with the software program for operating the general process to provide the functional service on demand, and (d) adding to the functional service the library by adding the set of stored pointers sent from the service agent as a first software program, and providing a pointer to the first software program.

BRIEF INTRODUCTION TO THE DRAWINGS

Figure 1:
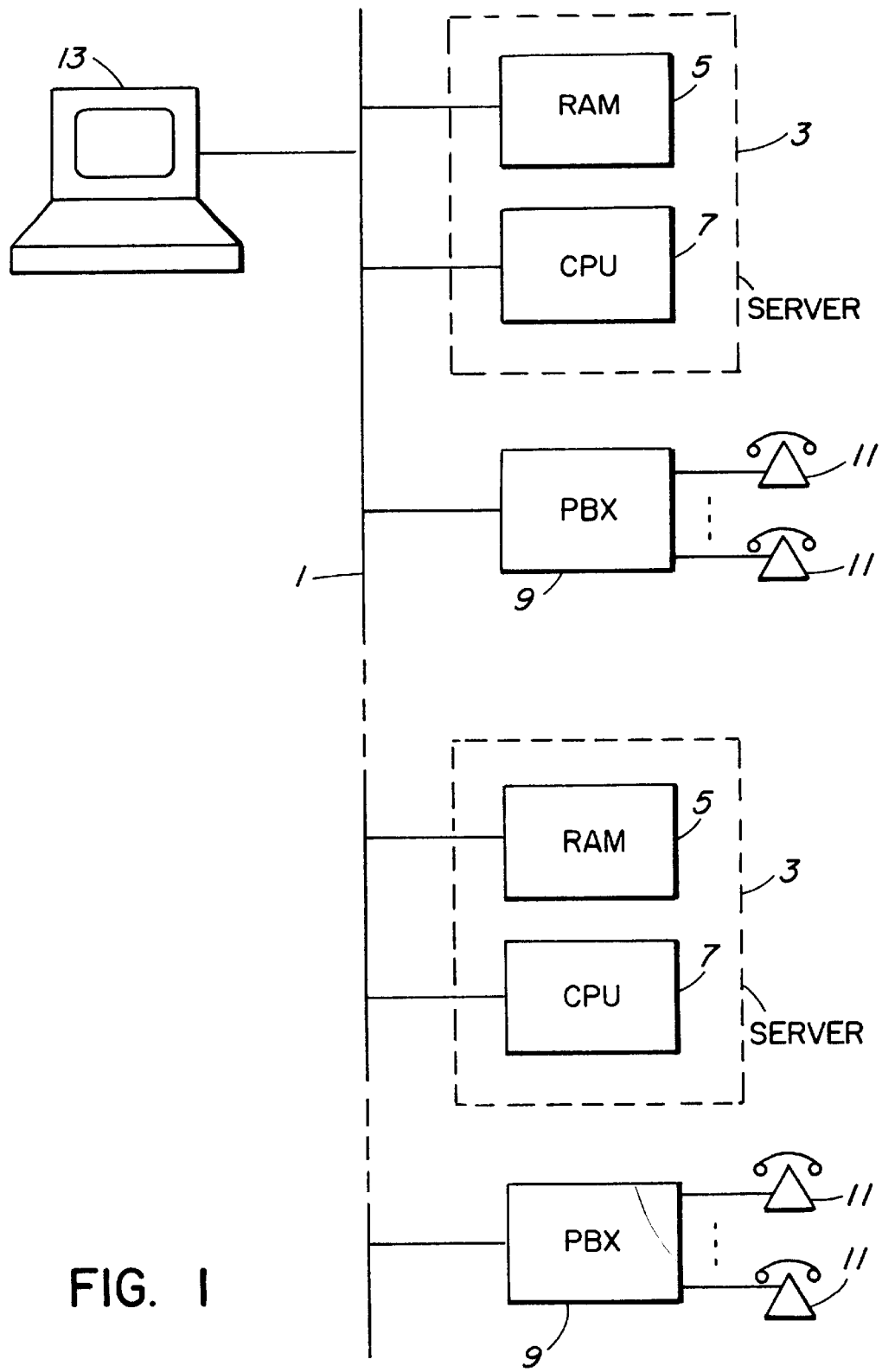
Figure 2:
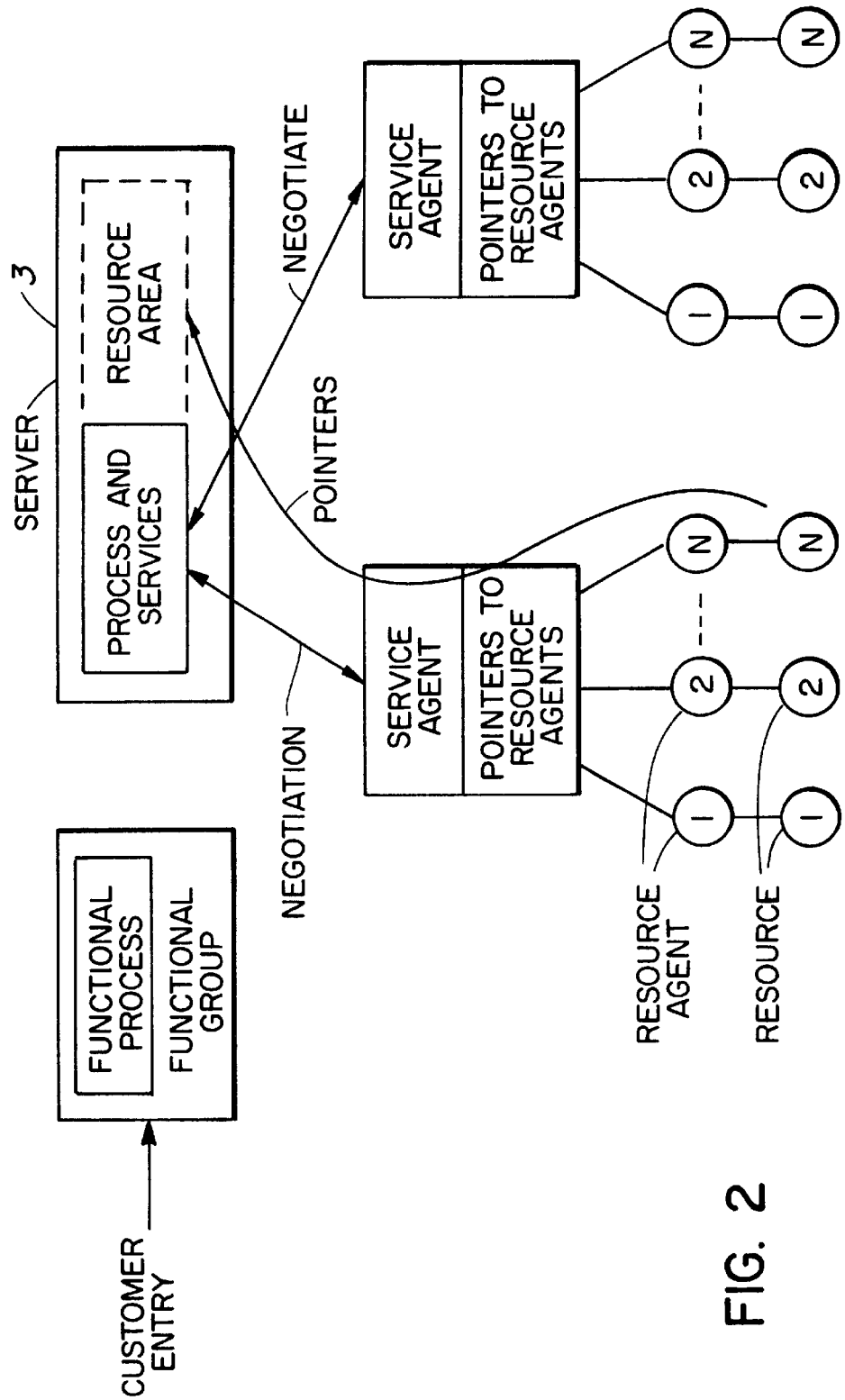
Figure 3:
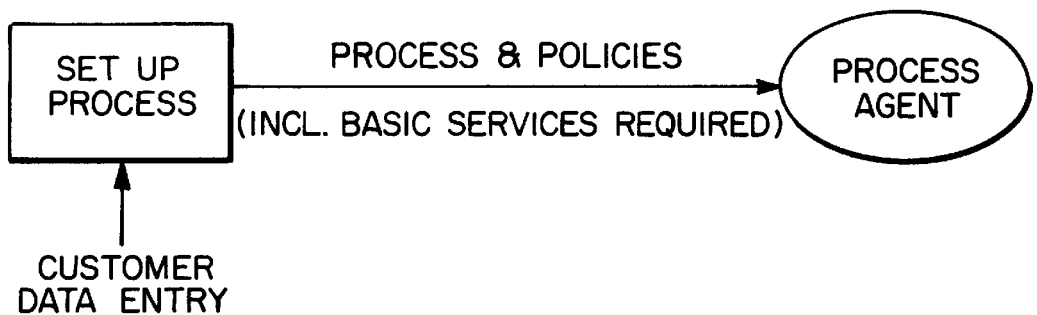
Figure 4:
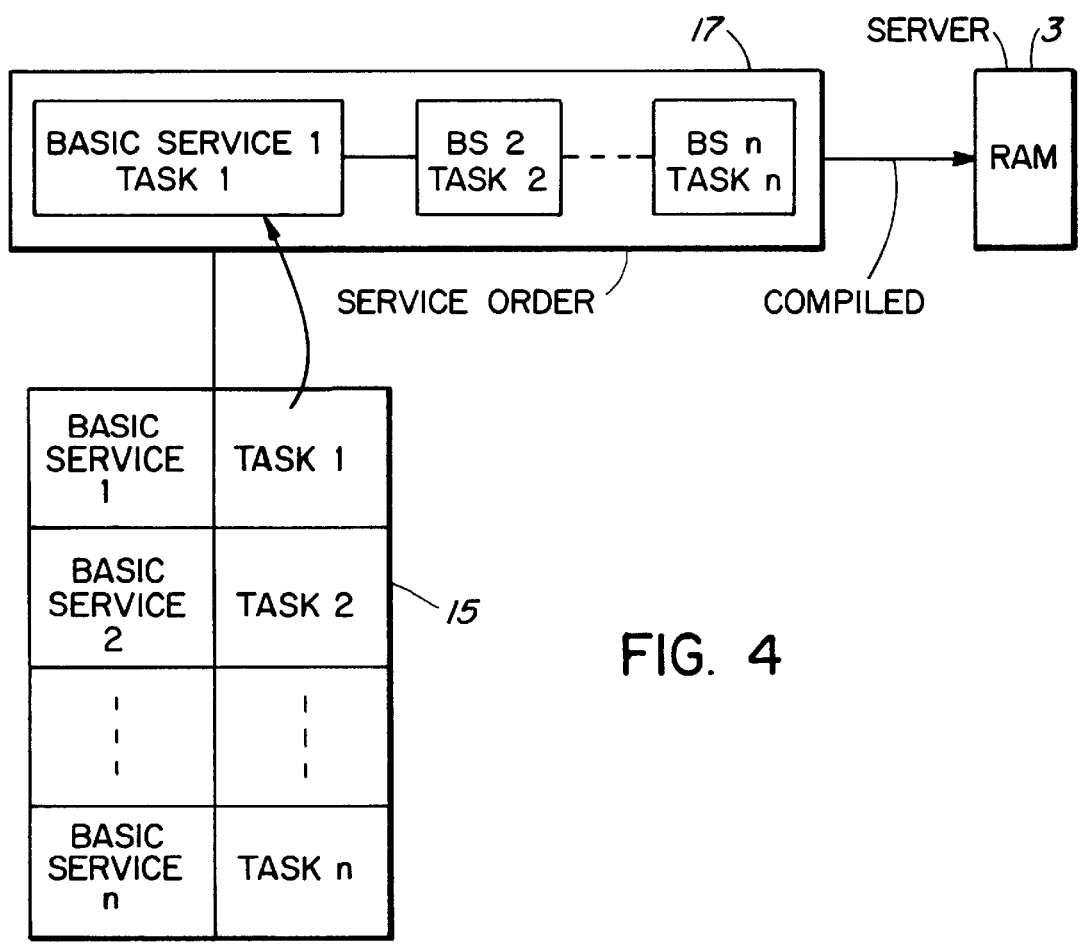
Figure 5:
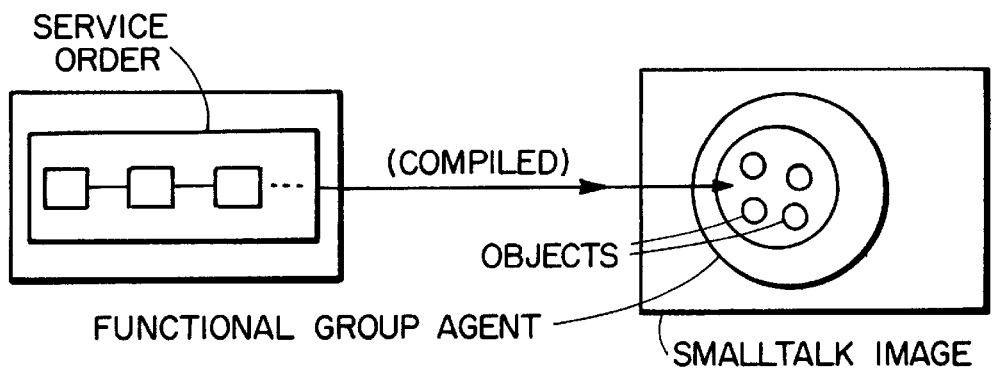
Figure 6:
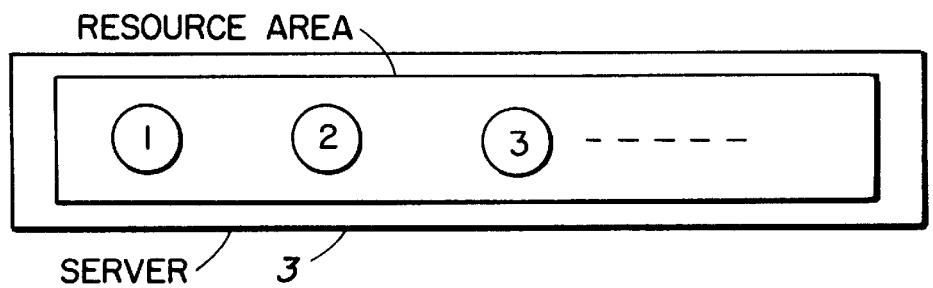
Figure 7:
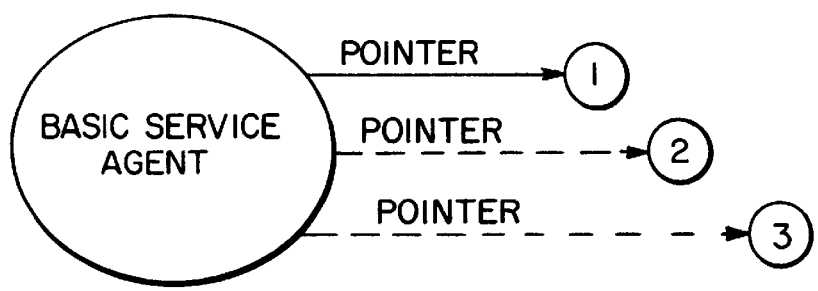
Figure 8:
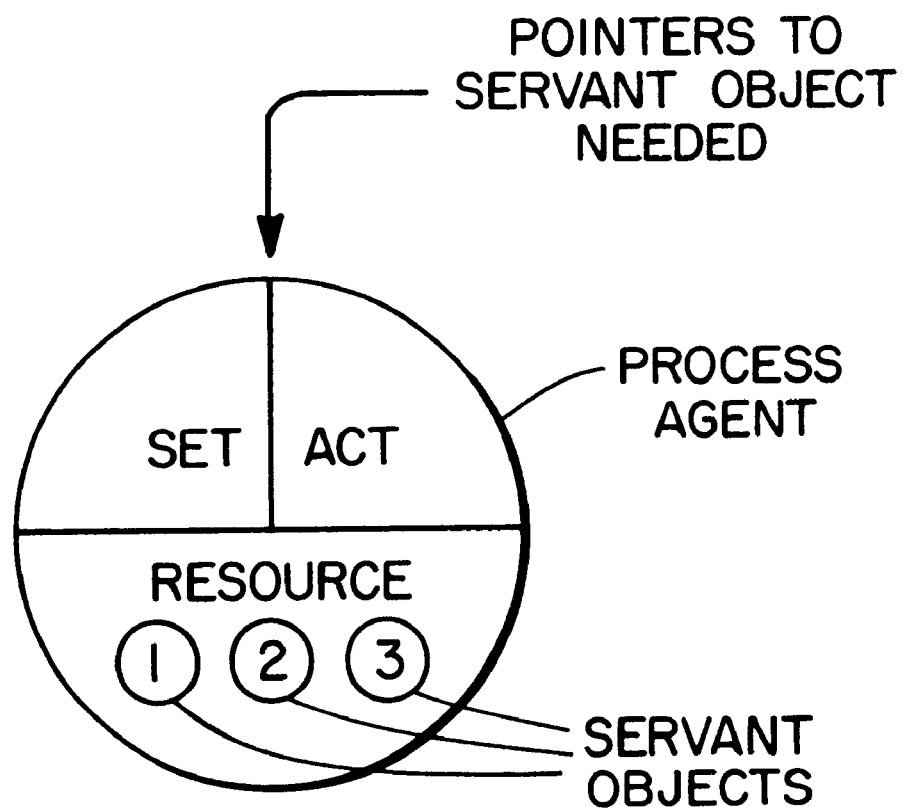

A better understanding of the invention will be obtained by considering the detailed description below, with reference to the following drawings, in which:

FIG. 1 is a block diagram of a structure in which the present invention can be implemented, FIG. 2 is a diagram illustrating the relationships of various software structures used in the invention, FIG. 3 illustrates process relationships used in a portion of the process, FIG. 4 illustrates the process relationships of FIG. 3 in more detail, FIG. 5 illustrates the process relationships of FIG. 3 in a different form, FIG. 6 illustrates a portion of the contents of the process agent of FIG. 3, FIG. 7 illustrates other process relationships used in another portion of the process, and FIG. 8 illustrates a process agent of FIG. 6 in a different form.

DETAILED DESCRIPTION OF THE PREFERRED EMBODIMENTS

The aforenoted patents describe the nature of software agent processing in a communication system. The present invention is a preferred method by which a process agent can avail itself of various resources without having knowledge of their specific characteristics.

FIG. 1 illustrates a network 1, which need not be a local area network, and could be several networks which communicate with each other by various well-known structures and techniques. At least one server 3 is connected to the network 1; several can be distributed and connected to the network 1 at locations which are established by e.g. traffic patterns, availability of physical locations, etc. Each server is comprised of at least a random access memory (RAM) 5 and at least a central processor (CPU) 7. The central processors 7 communicate via the network 1 or via a local subnetwork, with the associated RAM 5, and can communicate via network 1 with other CPUs 7.

For the sake of illustration, PBXs 9 also are connected to the network 7, and can communicate with each other via asynchronous transfer mode (ATM) cells, via data channels, and/or via separate trunk or data links (not shown). Telephones 11 are connected to the PBXs in a well known manner. However, it should be recognized that instead of, or in addition to, the PBXs, various other systems could be connected to the network 1, such as video phone systems, computers, etc.

The particular equipment connected to the network and how they communicate with each other is not the subject of the present invention, and is believed to be within the skill of a person skilled in the art.

A representative computer terminal 13 is also connected to the network 1, for communication with any of the CPUs 7.

Turning now also to FIGS. 2, 3 and 4, a customer enters a process into the system, using terminal 13. This can be comprised of filling in a form on the terminal 13, which is produced by a database program. By filling in the form related to a service, shown on the form as "basic service" (FIG. 4), an associated database program is executed, which relates to a particular type of function or task, shown on the form as "task 1", "task 2", etc.

Upon execution of the database program, a particular service task order for a service is created by the terminal 13, which is related to the particular task requested. For example, the task requested could be the establishment of speech generation. The order would include input and output parameters, such as the monitoring of a voiced input (e.g. by a user) for "yes" or "no", and the synthetically voiced response "you have selected 'yes' (or 'no')". The created service order, formed of a series of tasks is shown as reference 17.

Each of the service tasks (i.e. the output parameters of those service tasks) is saved using an unique name, so that it can be used as an input parameter for other basic service tasks later in the implementation of the service. These names are implemented as global variables.

It is preferred that the configuration and service setup so far described should be implemented in an object oriented computer language, such as Smalltalk. As is well known, a program in object oriented language is comprised of a self-contained routine and associated data, which can be "plugged into" various other routines and operate relatively independently, but which can be controlled by the other routines. Smalltalk is a language which has objects which include methods that can be invoked by sending the object a message.

The tasks in the configuration and setup described above are represented by methods inside of servant objects. The parameters (input and output) that are programmed in the configuration and setup should be translated into parameters for the methods.

As illustrated in FIG. 5, once a service has been created, i.e. the parameters are defined (and, it is preferred, an icon representing the service drawn on the terminal display), a script should be compiled which preferably takes the form of smalltalk code. This compiled script should then be loaded into a functional group of tasks 17 (FIG. 4), which thus describe a complete function for the service, for example, the detection of various sounds received from a user and machine creation of speech responses. These are shown in group 17 as task 1, task 2 . . . task n. The functional group is stored in a memory at the terminal 13 (FIG. 1).

Once the functional group has been defined, then this process and the policies which govern it (derived from the task object programs selected via the entries to the database) are loaded into the RAM 5 of any server 3 connected to the network 1, as a process agent, as shown in FIGS. 2 and 3, and as a Smalltalk image, as shown in FIG. 5.

The servers 3 also store service agents, (FIG. 2). Each service agent contains pointers to resource agents. Each resource agent is dedicated to a single resource. A resource can be, for example, a voice synthesizer.

It is preferred that the server RAM should contain a servant object library, which is formed of resource programs (objects, containing circled numbers) whose functions are to interface associated resource agents using the correct identifier for the resource agents with which it interfaces, as shown in FIG. 6. Thus each object in the library is able to communicate with one particular resource.

Thus each of the service agents has pointers to all of the objects in the servant object library which it uses to provide the basic service, as shown in FIG. 7.

When a process is initialized, it must negotiate usage rights for each basic service that is required to fulfill the objective of the process. It does this by establishing a blackboard bidding procedure as described in U.S. Pat. No. 5,802,396 granted Sep. 1, 1998. The service agents which can fulfill the requirements of the process bid on the request, and one service agent is selected, completing the negotiation. The selected service agent then passes to the process agent pointers to the resource agents, i.e. the servant objects (i.e. methods), that the process agent needs to fulfill the requirements of the process.

The process agent, having received the pointers, accesses the resource agents pointed to and copies of these resource agents are installed in the RAM in a resource area associated with the process agent, as shown in FIG. 8.

The process agent, now having direct access to the resource agents required to fulfill the tasks associated with the function, can carry out the process when required by the server.

It should be noted that the resource agents can be invoked from any functional group agent on the network. Thus service agents in RAM 5 of one server can be accessed, and can bid on a blackboard process established in another server, and the resulting resource agents transferred to the function process agent stored in RAM 5 of the other server.

It should be noted that once a process agent has been initialized, and contains all of its servants (resource agents), it then can fulfill its function (set of tasks) for any other process. Thus it adds itself to the object library which represents itself, and adds a pointer to itself to one of the service agents. In this way it makes itself available to other processes as a basic service.

In a similar manner, resource brokers (service agents) can reside in a library in RAM 5, and the process agent can download the code for the brokers it needs, to pick the appropriate resource for a process it is responsible for.

With the resources coded in an object code language, they can be easily and dynamically be added to the agent code. Once added to the agent code, the general process program can be operated upon request from other processing programs which control the operation of the system, such as the functioning of an auto attendant in a PBX, or the connection of a pair of telephones via one or plural PBXs.

As an example, when speech is to be generated, let us assume that the service can be provided by two different hardware devices (resources), each with a different identifier. Two service agents (objects) are written which translate the "generic" language of the instruction "generate speech" to the identities of the two resources. These objects are stored in a common library.

An agent is written which represents the basic service of speech generation, and which has knowledge of the storage location of the two service agents.

When a process is created which requires speech generation (e.g. an auto attendant), the process agent for the auto attendant obtains the pointers to the two service agents from the speech generation basic service agent, and copies the servant code into its own resource area.

Thus if a new hardware or software device which is added can perform speech generation, the servant code for it can be written and added to the library, the speech generation basic service agent is informed of the additional resource, and the next time the resource is required, the new code is automatically available. This facilitates availability of the various resources to processes required by the system in an efficient manner.

A person understanding this invention may now conceive of alternative structures and embodiments or variations of the above. All those which fall within the scope of the claims appended hereto are considered to be part of the present invention.

We claim:

1. A method of abstractly and recursively defining a functional service utilizing a process agent comprising:

(a) storing a library of first software programs for operation of system resources, (b) storing a second software program for operation of a service agent which provides said functional service, and which includes pointers to associated ones of the first software programs which are controlled by the service agent, (c) storing a software program for assembling a general process to provide said functional service, including the steps of:

(i) requesting the usage right for system resources controlled by the service agent required by the general process, (ii) sending a set of pointers to system resources required for the general process from the service agent to the software program for invoking the general process, and (iii) storing said set of pointers sent from the service agent in association with the software program for operating the general process to provide said functional service on demand, and (d) adding said functional service to said library by adding said set of stored pointers sent from the service agent as a first software program, and providing a pointer to said first software program.

2. A method as defined in claim 1, including providing plural second software programs representing plural corresponding service agents each including pointers to particular associated ones of said first software programs, and in which step (c) (i) includes requesting a usage right for functional services represented by said plural service agents.

3. A method as defined in claim 2 in which the step of requesting a usage right is performed by posting a service requirement to a blackboard system, said second software program bidding on the posted service requirement, and in which step (c) (ii) includes sending pointers from a service agent which succeeded in the bidding.

4. A method as defined in claim 3 in which each of the first software programs is a software object.

5. A method as defined in claim 1 in which the step of storing a software program invoking a general process is comprised of a user indicating a service requirement on a user terminal, establishing a group of tasks to fulfill the service requirement as a service order, compiling the group of tasks in an object oriented language code, defining objects, and loading the objects into a functional group agent in a server in which said software program for invoking a general process is to be stored.

* * * * *